Dec. 20, 1932.                F. N. SAYRE                1,891,502
                          PLOTTING INSTRUMENT
                   Filed Jan. 21, 1927        5 Sheets-Sheet 2
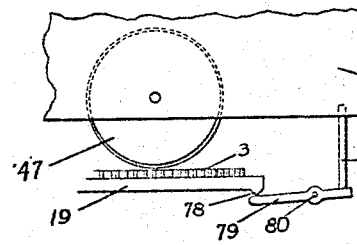
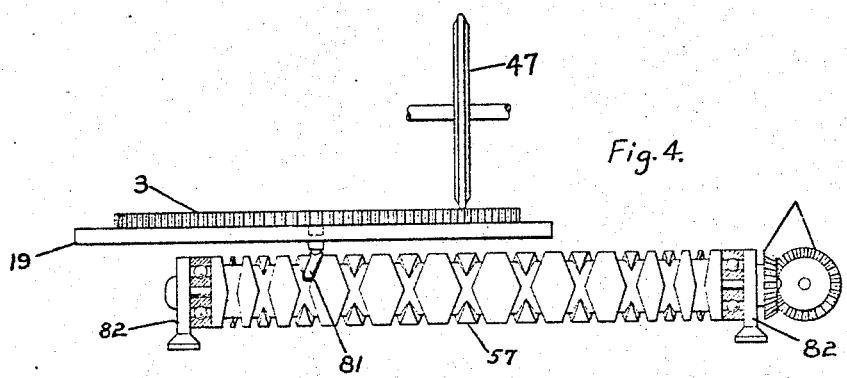
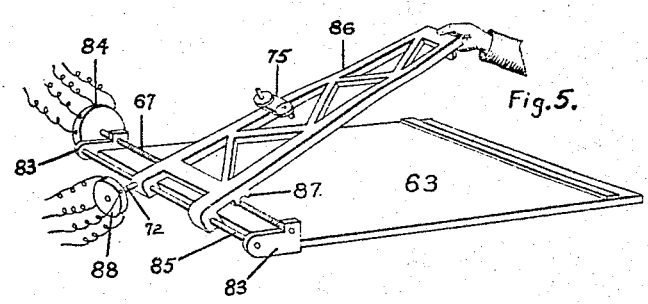
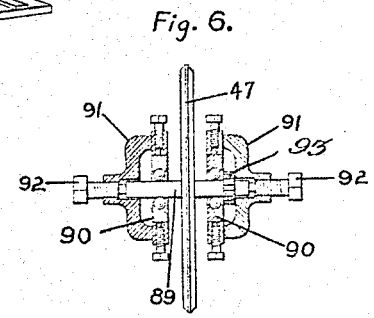
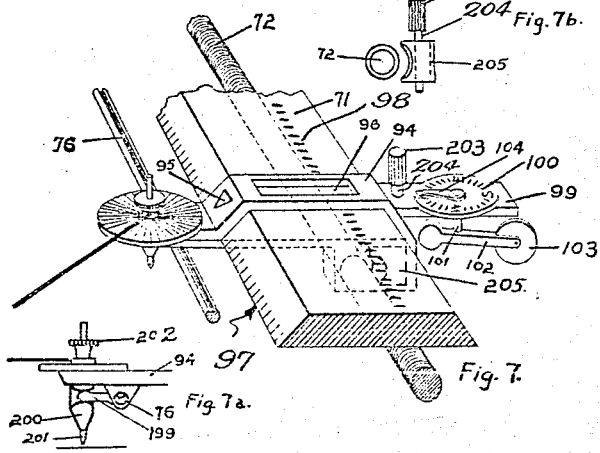

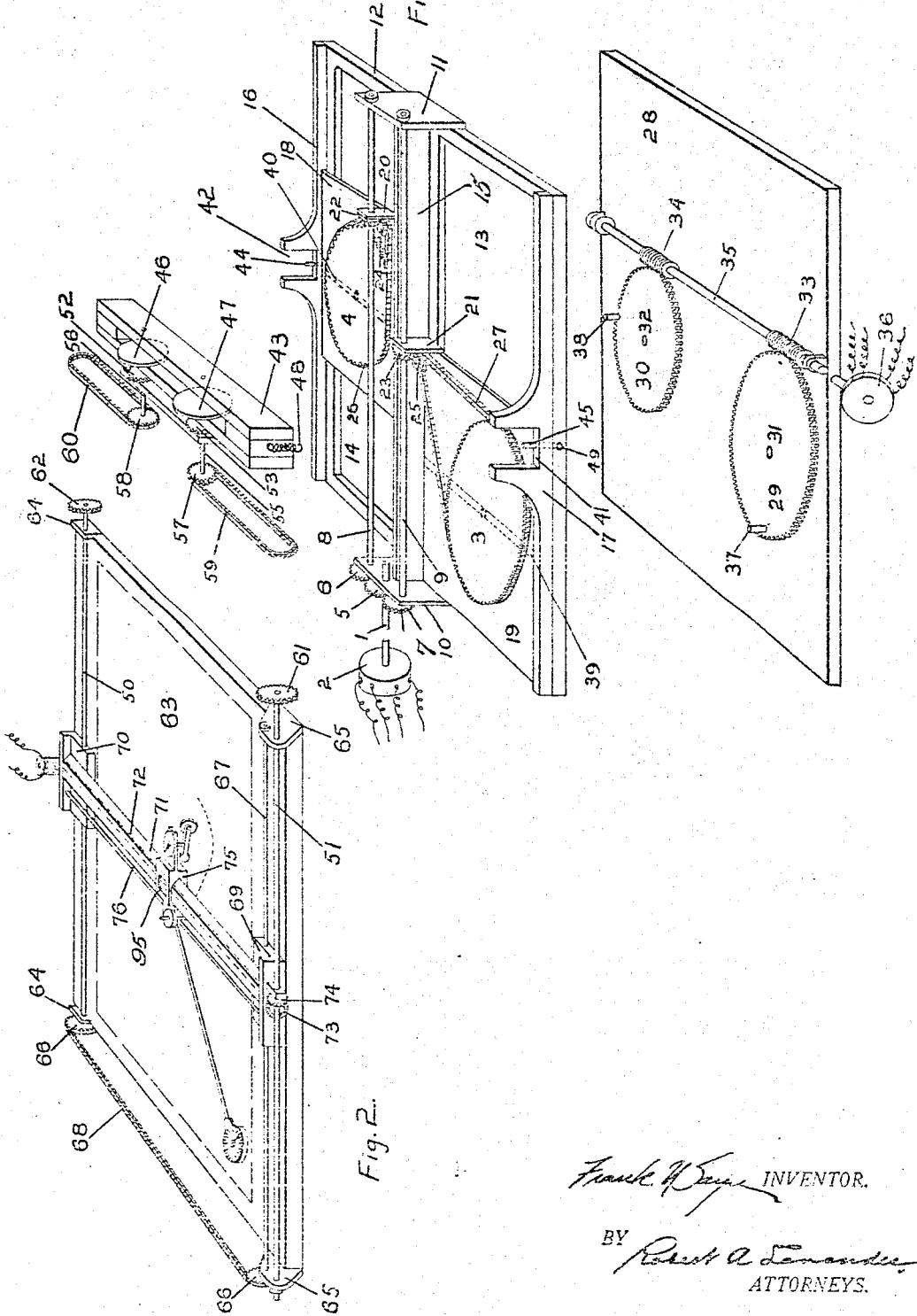

Dec. 20, 1932.  F. N. SAYRE  1,891,502
PLOTTING INSTRUMENT
Filed Jan. 21, 1927  5 Sheets-Sheet 3
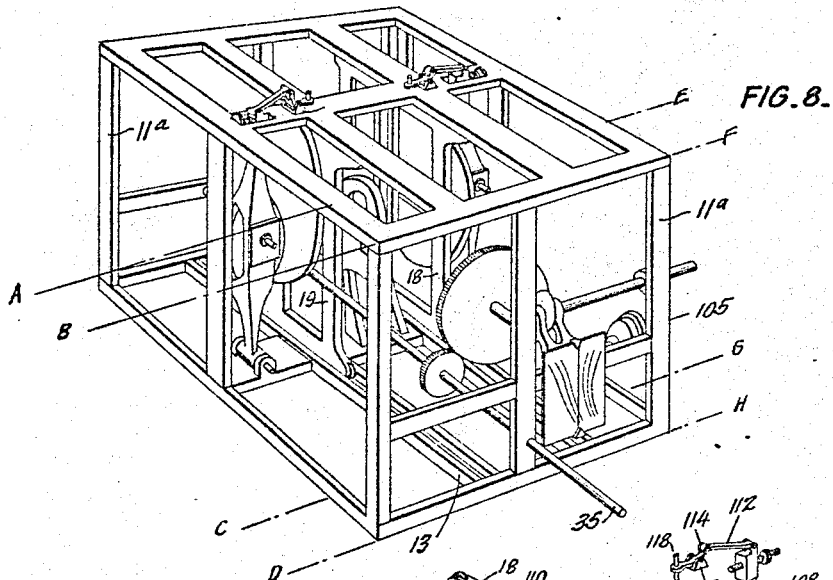
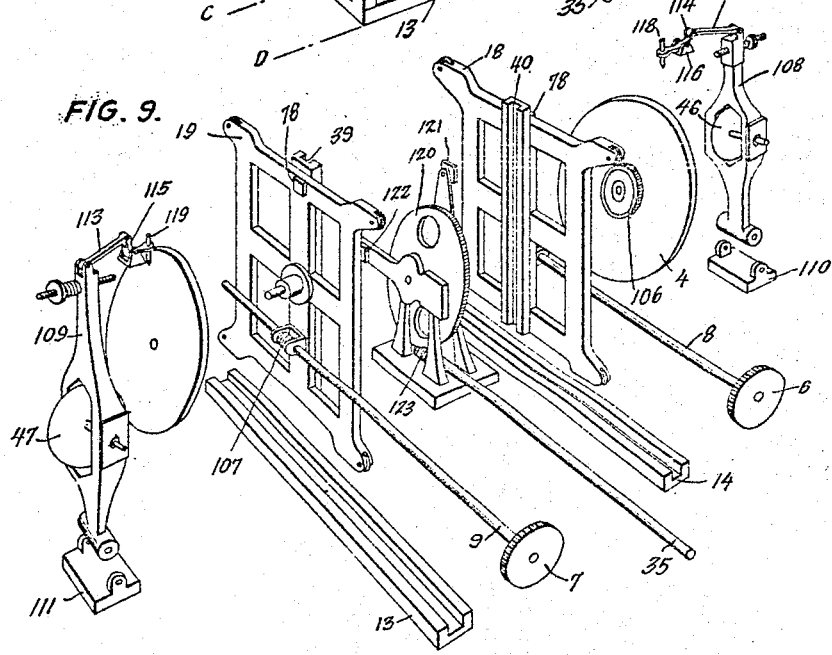
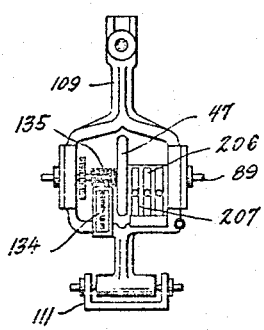
INVENTOR
FRANK N. SAYRE
BY
*Robert A. Lavender*
ATTORNEY Dec. 20, 1932.                F. N. SAYRE                  1,891,502
                          PLOTTING INSTRUMENT
                         Filed Jan. 21, 1927      5 Sheets-Sheet 4
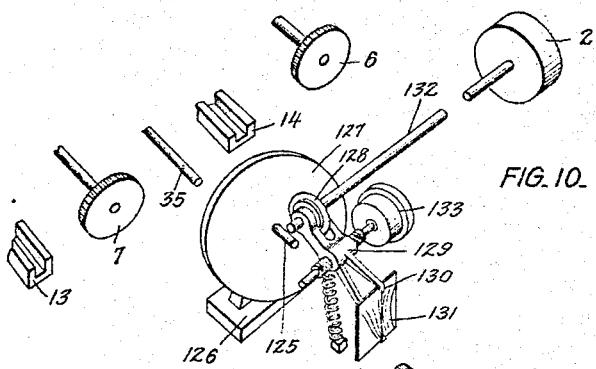
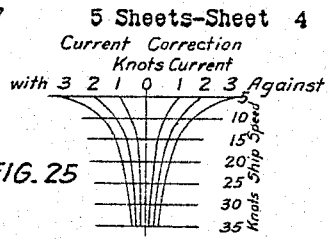
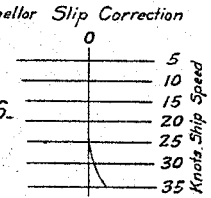
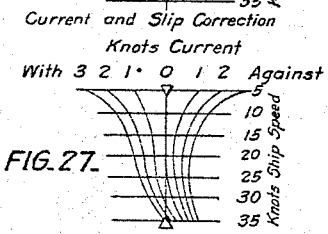
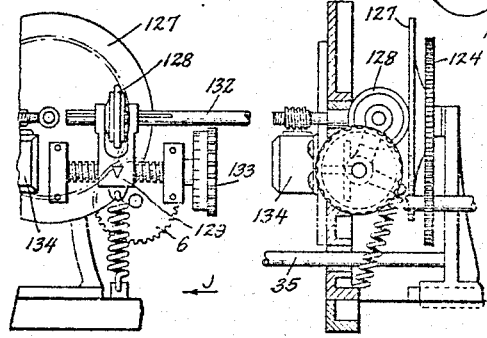
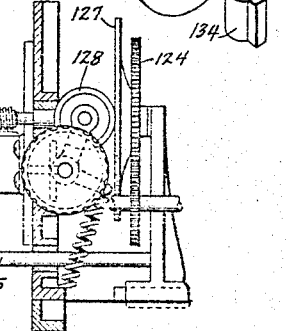
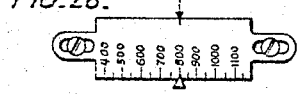
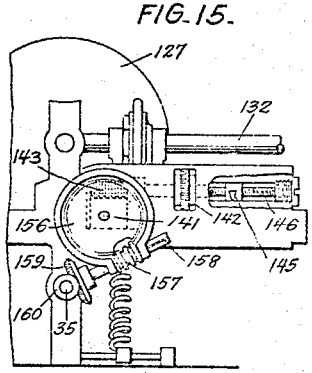
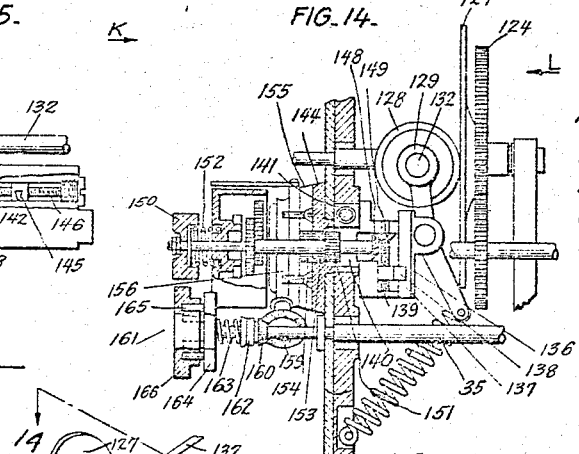
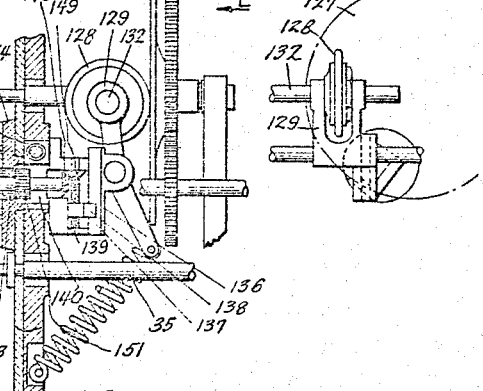
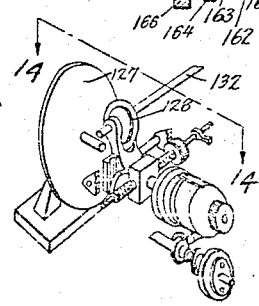
INVENTOR
FRANK N. SAYRE
BY
ATTORNEY

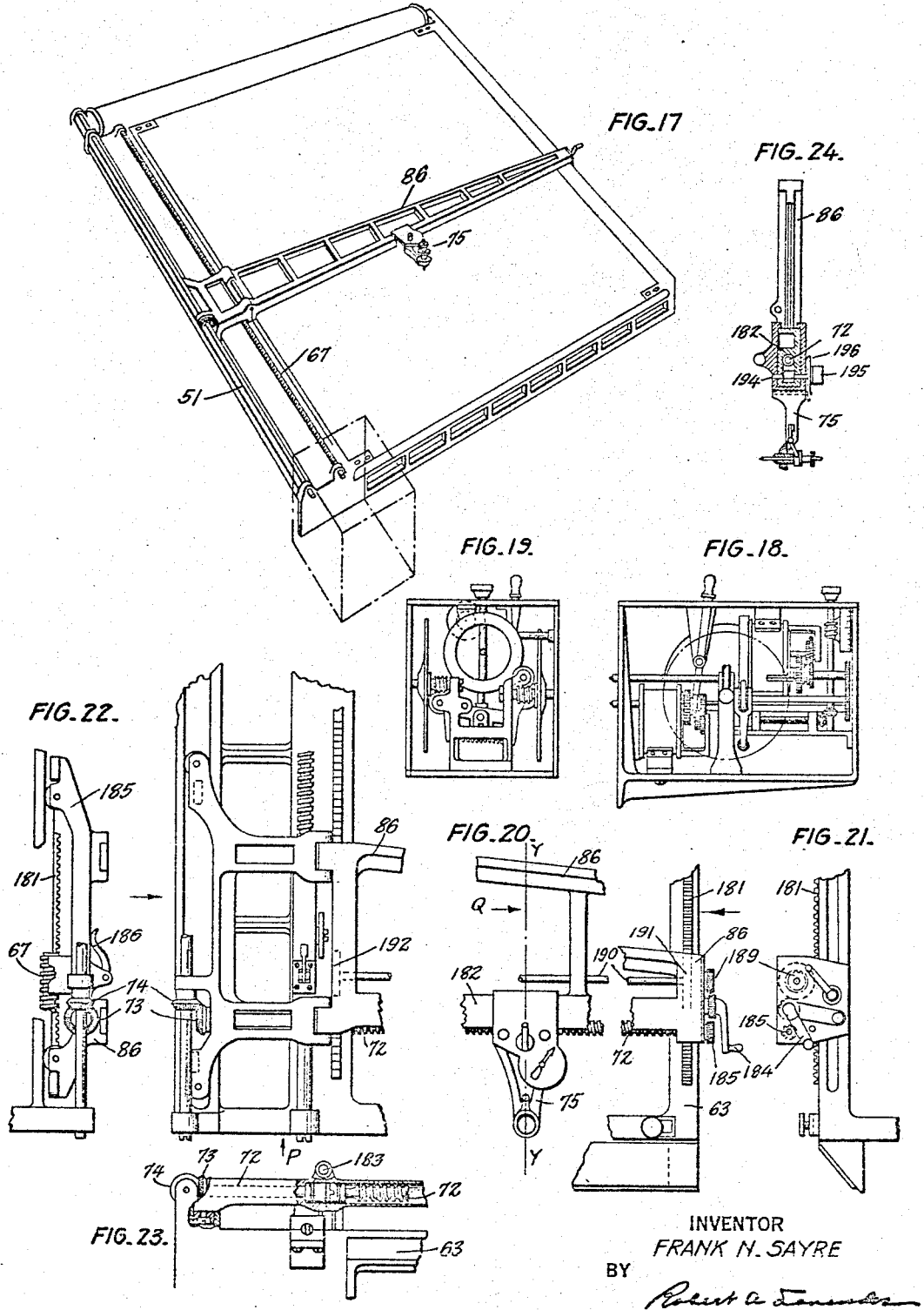

Patented Dec. 20, 1932

1,891,502

UNITED STATES PATENT OFFICE

FRANK N. SAYRE, OF SAN FRANCISCO, CALIFORNIA

PLOTTING INSTRUMENT

Application filed January 21, 1927. Serial No. 162,532.

(GRANTED UNDER THE ACT OF MARCH 3, 1883, AS AMENDED APRIL 30, 1928; 370 O. G. 757)

My invention relates broadly to recording instruments and more particularly to devices for recording the movement of a body in a single plane.

The principal object of my invention is to provide means for graphically recording the motion of a body, hereinafter designated as a carrier, on a plane surface such as recording the motion of a ship over the surface of the ocean or the motion of an airplane over the earth's surface.

Another object of my invention is to provide means for continuously and automatically indicating the distance and bearing of an object, such as a stationary or moving ship from the carrier upon which my device is mounted.

A further object of my invention is to provide a means for correcting the errors in recording the track of the carrier that are introduced into such a track by the movements of the medium through or upon which the carrier is moving.

A further object of my invention is the application of means within my recorder to compensate for errors introduced into the graphic record by the variable traction of the motive power of the carrier in the medium traversed.

A further object of my invention is the utilization of means for correcting the track of the motion of the carrier for the errors introduced therein by known deviations in the direction indicating instruments.

To attain these and other objects, and in accordance with the general features of this unitary and related invention, the improved method contemplates, in the operation of recording the course of the relative motion of a body and a plane surface, the steps, substantially simultaneously with said motion of making two movements, each of whose magnitudes is proportional to the relative velocity of said motion; then, transforming said first movements into two linear right angled movements, the rate of one of which being proportional to the sine, and the other to the cosine, of the angle between the direction of said relative motion and a reference direction; and substantially simultaneously transforming said two right angled movements into a resultant single movement upon a record; and further contemplates the varying of the rate of movement to be imparted from said sine movement to compensate for currents and other traverse conditions; and further contemplates the varying of the rate of movement to be imparted from said cosine movement to compensate for drift and other variable directional conditions; and further contemplates that said first named movements may be successively or progressively made.

To demonstrate the practical utility of my said method a related, improved and novel apparatus embodying my invention, and which may be used advantageously and economically in practicing said improved method as a unitary invention, is provided to also serve as an example, to those skilled in the art, of the facility with which, after becoming familiar with my invention, the many forms and kinds of existing apparatus, with or without substantial modification, may be employed in the efficient practice of my said method.

These and other objects of my invention will be more apparent from the following detailed description and the accompanying drawings, illustrating one embodiment of my invention in an improved apparatus, of the many different forms and characters of apparatus, each of which may be adapted to be employed in the practice of my improved method.

Further objects of my invention will appear more fully hereinafter during the description of my device.

The objects of my invention are accomplished by differentiating the motion of the carrier into a number of components, transferring these components into motions of an independent member, in directions perpendicular to each other, combining these perpendicular motions into a single integrated motion of the independent member, and tracing the motion of the last mentioned member upon a platted chart. The tracing of the motion of the member over the platted chart therefore represents the motion of the carrier over or through the medium over which it travels.

My invention consists substantially in the construction, combination and arrangement of parts associated therewith or as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which;

Figure 1 is a disassembled isometric drawing of one form of my invention,

Figure 2 is a view of the record board with its parts shown in operative relation to but at a distance removed from the operating parts of Figure 1, Figure 3 is a modification of a friction displacing mechanism shown and described with reference to Figure 1, Figure 4 is an alternative mechanism to be used in the place of plates 29 and 30 of Figure 1, Figure 5 is a modification of my improved type of record board, Figure 6 is a detailed construction of the yoke mountings, bearings and adjustable members for the mounting of the friction wheels used in the various modifications.

Figure 7 is a detail view of the recording stylus and carriage used in conjunction with the improved plotting board, Figure 7a is a detail end view of the stylus tracer showing the apparatus for raising the stylus from the tracing chart, Figure 7b is a detail view of the mechanism for releasing the stylus tracer and carriage from engagement with the worm screw 72 for movement of the stylus tracer to a point upon the chart indicative of the original position of the carrier before the placing of the device in operation, Figure 8 is a perspective view of a modification of my device wherein the number of operating parts of the device shown in Figure 1 are substantially reduced, Figure 9 is a perspective view of the primary parts of Fig. 8 with their supporting framework removed for clearness.

Figure 9a is a detail view of the manner of mounting friction disc 47 within the frame 109 and of the transmitter used to control the follow-up motors shown in Figures 18 and 19, Figure 10 is a disassembled isometric view of the parts shown in the portion designated as ABCDEFGH of Figure 8, Figure 11 is a front view of the device shown in Figure 10, with the scale removed, Figure 12 is a side view in the direction of the arrow J of the device shown in Figure 11, Figure 13 is an isometric view of the modification of the device used in the place of the element shown in Figure 10, that operates in conjunction with scales shown in Figures 25-28, to introduce the corrections designated in the various legends of those figures, Figure 14 is a cross-section on line 14—14 of Figure 13, Figure 15 is an end view of the device shown in Figure 14 in the direction of the arrow (K), Figure 16 is an end view of the device shown in Figure 14 in the direction of the arrow (L), Figure 17 is an isometric view of a modification of my improved record board with associated parts, Figure 18 is a detail view of the portion of Figure 17 designated as QRSTUVW, Figure 19 is an end view of the device shown in Figure 18 in the direction of the arrow (M), Figure 20 is a detail view in broken parts of the arm 86 of Figure 17, Figure 21 is an end view of the arm shown in Figure 20 in the direction of the arrow (N), Figure 22 is an end view of the arm shown in Figure 20 in the direction of the arrow (O), Figure 23 is an end view of the arm shown in Figure 20 in the direction of the arrow (P), Figure 24 is a sectional view on the line (Y—Y) of the arm shown in Figure 20 in the direction of the arrow (Q), Figures 25 to 28 represent the scales to be used in conjunction with the device shown in Figure 13.

Referring particularly to Figure 1, numeral 1 represents a shaft that is driven by any well known means, as, for example, a log motor 2, at a speed of rotation proportional to the speed of the moving carrier. The rotary motion of shaft 1 is transmitted to flat driving discs 3 and 4 through gear 5 to gears 6 and 7 on the end of splined shafts 8 and 9, mounted in bearing plates 10 and 11 upon the opposite sides of base 12. Upon the base 12 are two carriage ways 13 and 14 formed by brace members 15, 16 and 17. Within these carriage ways are placed two carriages 18 and 19 upon which the driving discs 3 and 4 are mounted. These carriages also support bearing plates 20 and 21 upon which gears 22 and 23 are respectively mounted and held in position upon splined shafts 8 and 9 respectively. The rotation of gears 22 and 23 is imparted to the flat discs 3 and 4 through miter gears 24 and 25 and endless chains 26 and 27 respectively.

Mounted beneath the base 12 is a member 28 upon which rest rotary gears 29 and 30 which gears are pivoted in fixed positions by pivots 31 and 32. These gears are rotated by worm gears 33 and 34 mounted upon shaft 35 that is driven at a speed corresponding to the rate of change in direction of the motion of the carrier over the plane surface upon which it travels. Shaft 35 is driven by any well known means such as a follow-up motor, 36, electrically connected to the directive indicating device of the carrier.

Upon gears 29 and 30 are respectively placed two pins 37 and 38 disposed in an angular relationship of 90° to each other and adapted to fit respectively in slots 39 and 40 formed on the under side of carriages 19 and 18 respectively. It will be seen that as the shaft 35 rotates gears 29 and 30, the sliding carriages 19 and 18 will move in a reciprocating motion proportional to the cosine of the angular displacement of the revolvable gears 29 and 30.

Within suitable guides 41 and 42 in brace members 17 and 16 is positioned a carriage member 43 capable of movement in a vertical direction but fixed with respect to any horizontal movement by the sides of the guides 41 and 42 and by pins 44 and 45 at the base of the guides. Additional functions of the pins 44 and 45 are described with reference to Figure 3. The weight of carriage member 43 has been found sufficient to maintain discs 46 and 47 in frictional engagement with the surface of rotating discs 4 and 3. However, should it be found that there is any slip between the friction discs 47 and 46 and the rotating discs 3 and 4, a slight additional pressure may be exerted between the two by placing a tension upon spring 48 and a corresponding spring at the opposite end of carriage member 43 affixed thereto and attached to lug 49 upon the base 12.

The rotary motion imparted to friction discs 46 and 47 is imparted to worm shaft 50 and splined shaft 51 of Figure 2 by means of reduction gearing 52 and 53, shafts 55 and 56, gears 57 and 58, endless chains 59 and 60, and gears 61 and 62, or by suitable electrical connection such as a transmitter and follow-up motor.

Referring now to Figure 2, 63 represents the record board upon the corners of which are mounted bearing plates 64 and 65, in which worm shaft 50 and splined shaft 51 are mounted respectively.

The rotary motion imparted to worm shaft 50 is imparted to a mate worm shaft 67 mounted in bearing plates 65 at the opposite side of the plotting board by means of gears 66 and endless chain 68.

Mounted upon the record board in suitable guideways are blocks 69 and 70 that carry nut members engaging the worm shafts 67 and 50 respectively but are disengageable by raising the entire carriage or by relative motion between the carriage and the nut member operated by the worm shaft. Blocks 69 and 70 are rigidly fixed together by means of hollow member 71. Within the hollow member 71 is located a worm screw 72 upon the end of which is a miter gear 73 in engagement with miter gear 74 operating upon splined shaft 51.

Mounted upon the surface of hollow member 71 is a stylus carriage 75 shown and described in detail with reference to Figure 7.

Mounted between the blocks 69 and 70 is spline shaft 76 operated by an electromagnetic arm 199a secured thereto and operated by electromagnet 77 to raise the stylus and thereby interrupt the tracing movement of the stylus. The detail mechanism whereby this effect is obtained, is described with reference to Figures 7, 7a and 7b.

Referring particularly to Figure 3, a detail view of a portion of the mechanism of Figure 1, 43 represents the carriage member shown in full in Figure 1. 45 represents a pin extending into groove guide 41 and 3 represents the flat driving disc. Upon the under side of the carriage 19 is placed a lug 78 that engages with a lever 79 pivoted at a point 80. The opposite end of lever 79 engages the lower end of pin 45. In this manner, when carriage 19 is moved to a dead center position, lug 78 engages the lever 79 whereby friction discs 46 and 47 are raised out of engagement with the driving discs 3 and 4.

A similar device is used with reference to driving disc 4, to prevent the wear upon the friction discs when disc 4 is at its dead center position.

Figure 4 represents a device that may be substituted for the elements shown in Figure 1 that are mounted upon the member 28. This device consists of a helical screw of varying pitch such that lug 81, attached to carriage 19 upon which disc 3 is mounted, is given a motion identical with that described with reference to Figure 1. This helical screw is mounted in end thrust ball bearing races 82 and is connected to follow-up motor 36.

Referring particularly to Figure 5, which represents a detail view of one form of my improved plotting board, 63 represents the base upon one end of which is mounted bearing plates 83 through which is mounted worm screw 67 which is driven by follow-up motor 84 at a speed corresponding to the speed of rotation of gear 52 of Figure 1. Between the bearing plates is mounted a guide shaft 85 upon which is mounted an arm 86 of the type shown, which arm carrier members 87 engageable with worm screw 67. Lengthwise of the arm is mounted a worm screw 72 driven at a speed corresponding to the rotation of gear 53 of Figure 1 by follow-up motor 88. The arm 86 carries a stylus carriage 75 in engagement with the worm screw 72 and similar to that to be described with reference to Figure 7 and as mentioned with reference to Figure 1.

Referring to Figure 6, 17 represents the friction discs of Figures 1, 3 and 4 mounted upon axle 89 which in turn is mounted in ball bearing races 90. These races are held in position in supports 91. Endwise adjustment of the axle 89 is made possible by means of screws 92. Upon the axle 89 is gear wheel 93 forming a part of the reduction gearing 53 of Figure 1.

In Figures 7, 72, 76 and 71 respectively represent the worm shaft, splined shaft and hollow member described with reference to Figures 1 and 5. Around the hollow member 71 is positioned a carriage device 94 with indices 95 and 96 which travel over scales 97 and 98. The carriage device engages the worm shaft 72 in the manner shown in dotted lines. By means of arm 99 attached to the carriage device 94, there is supported a dial 100 calibrated in degrees, through the center of which is mounted a shaft 101. Upon the lower end of the shaft 101 is supported a balanced arm 102 carrying a wheel 103 that remains in contact with the surface of the record chart. Upon the upper end of the shaft 101 and rigidly affixed thereto is an index arm 104 in slidable contact with the calibrated dial 100. It will be seen that as the stylus carriage moves over the surface of the record chart the action of wheel 103 upon the chart keeps the index arm 104 at a point upon the calibrated dial indicative of the direction of the motion of the carriage 94 over the surface.

Referring particularly to Figure 7a, 76 represents the splined shaft upon which is mounted a lever 199 that engages the member 200 which is movable in a vertical direction within the carriage member 94. Member 200 carries the tracing element 201 that is held in a fixed position by any setting device designated as 202.

In Figure 7b numeral 203 represents a thumb knob upon the end of an eccentric shaft 204 that is mounted within the female member 205, that engages the worm shaft 72. When it is desired to move the stylus carriage 94 along the hollow member 71 thumb knob 203 is rotated to a position such as that shown in the dotted lines of Figure 7. This allows the free movement of the stylus member along the east-west directions of the record chart.

Referring particularly to the modification shown in Figures 8 and 9, 11a represents a frame in which carriage ways 13 and 14 are mounted. Within the carriage ways 13 and 14 are positioned the reciprocating carriage members 19 and 18 upon which flat driving discs 3 and 4 are mounted respectively. Motion is imparted to discs 3 and 4 by means of worm gears 106 and 107 upon splined shafts 8 and 9 respectively, these being driven by gears 6 and 7 which are actuated by follow-up motor 2, as described with reference to Figure 1. 46 and 47 represent friction discs mounted in frames 108 and 109 which are pivoted to frame 105 by members 110 and 111. Arms 112 and 113 pivoted to the upper ends of frames 108 and 109 engage rocker arms 114 and 115 which are mounted in bearings 116 and 117 rigidly affixed to the frame 105. Upon the inner ends of rocker arms 114 and 115 are mounted adjustable elements 118 and 119 which consists of set screws and lock nuts that engage lugs 78 upon carriage 18 and 19 when either of the carriages are in dead center position.

The essential difference between this device and that described with reference to Figures 1 and 2 is the substitution of one disc gear 120 upon which there are two arms 121 and 122 mounted at right angles to each other, and driven by the shaft 35 through gearing 123, in the place of the two discs 29 and 30 and their associated parts as described in Figure 1.

The rotary motion imparted to friction discs 46 and 47 is transmitted to the elements of the record board in a manner similar to that described with reference to Figure 1.

Referring particularly to Figure 9a, 109 represents the frame within which friction disc 47 is mounted. Upon the shaft 89 of friction disc 47 is mounted a commutator 206 that operates electrical contacts 207, that are connected in the field of follow-up motor 168 of Figure 18. In this manner any motion of the friction disc 47 is imparted to motor 168 to accomplish the desired result as described with reference to Figure 18.

Referring to Figures 10 and 12, numerals 13 and 14, 6 and 7, 35 and 36 represent the carriage ways, gears, shaft, and follow-up motor described in Figures 8 and 9. In engagement with gears 6 and 7 is a main gear 124 that is mounted upon a shaft 125 through support member 126 which is affixed to the frame 105. Upon this shaft a bearing plate 127 is mounted adjacent the opposite side of the support member 126. Against the surface of plate 127 bears a friction wheel 128, which is mounted in a yoke 129 and this in turn is adjustable by means of calibrated thumb screw 133. Upon this yoke is located a pointer 130, shown in operative relation to scale 131, detail figures of which are designated as Figures 25 to 28. Through friction wheel 128 is a spline shaft 132 connected to follow-up motor controlled by the speed log motor.

It will thus be seen that variation in the setting of the friction disc 128 along a radius of bearing plate 127 will introduce a variation in the rotation of gears 6 and 7 and this in turn introduces a correction in the tracing of the stylus 75 over the chart. Upon the end of shaft 125 is a revolution counter 134 connected thereto by means of suitable gearing 135.

Referring to Figures 13 to 16, which represent a modification of the device to be substituted for the mechanism shown and described with reference to Figures 10 to 12, 127 represents the flat driving plate against the surface of which friction wheel 128 mounted upon spline shaft 132, is held in position by yoke 129. The position of yoke 129 is adjustable by means of member 136 that contains a slot 137 into which is inserted a lug 138. Lug 138 is mounted upon worm screw 139 that is fixed in the bearing in housing member 140, which is rotatable in bearings 141 that is mounted in frame 105. Bearing 141 is adjustable laterally by means of calibrated thumb nut 142 that rotates worm shaft 143 which is threaded in bearing 141. The relative position of bearing 141 is indicated by index 145 movable upon worm shaft 146 of the same pitch as worm shaft 143. Upon the outer surface of the frame 105 and rigidly affixed to housing member 140 and rotatable therewith in bearing 141 is a calibrated dial 144.

Mounted within the housing member 140 is shaft 147 that is adjustable to three distinct positions. Upon the inner end of shaft 147 is a miter gear 148 that engages miter gear 149 that is mounted upon worm screw 139 the motion of which adjusts lug 138 longitudinally of worm screw 139. This motion is accomplished by means of thumb nut 150 that is upon the outer end of shaft 147 when the shaft 147 and its associated parts is in its extreme inner position.

Upon shaft 147 is positioned a land member 151 with lands every five degrees apart. When the shaft 147 is in its extreme inner position land member 151 rotates freely within a pocket in housing member 140. When shaft 147 is moved into its intermediate position by the action of spring 152, exerting an outward pressure upon thumb-nut 150, land member 151 engages with the fluted portion 153 of calibrated dial member 144.

It will be noted that when the lug 138 has been set at any desired position by means of the rotation of thumb nut 150, which adjustment determined the amount of throw exerted upon yoke 129, and when shaft 147 is moved to its intermediate position, any rotation of thumb nut 150 causes an adjustment of the friction disc 128 along the radius of bearing plate 127. Adjustment of lug 138 along the worm screw 149 therefore introduces a correction to the track for the amount of current in the medium through which the carrier is travelling. Likewise the adjustment of housing member 140 about its axis of rotation introduces a correction into the track for the angular direction of the current relative to the course of the carrier through the medium.

When shaft 147, with its corresponding parts, is in its extreme outer position land member 151 engages the fluted portion 153 of calibrated dial 144 and the fluted portion 154 of member 155, which is mounted upon a bearing shaft 147. In this manner the entire system is locked together. Upon member 155 and rigidly affixed thereto is a worm wheel 156 that engages a worm gear 157 that is mounted upon a shaft 158 upon one end of which is a bevel gear 159 that engages a second bevel gear 160 mounted upon shaft 35 of Figures 10, 11, and 12.

The coupling unit between the shaft 35 and the shaft 161 of the follow-up motor 36 is through friction clutch 162 against which bears spring 163 that is under compression. The other end of spring 163 bears against member 164 that carries a plurality of pins which engage in pockets in gear 166, that is upon the shaft 161 of motor 36. By the use of such a mechanism any angular adjustment between the shaft 161 of follow-up motor 36 and the shaft 35 may be made with facility, to correct the plotting of the chart for any temporary errors in the direction determining apparatus of the carrier.

Referring particularly to Figure 17, 63 represents the record board, 86 the tracer arm, 67 the north-south worm rod, 51 the spline shaft transmitting the east-west component to the stylus tracer 75 of Figures 1 and 5. 167 indicates a unit attached to the worm rod 67 and the spline shaft 51, details of which are shown and described in reference to Figures 18 and 19.

Referring particularly to Figures 18 and 19, numeral 168 designates a follow-up motor driven at a speed corresponding to the speed of rotation of friction disc 47 of Figures 1 and 9. The rotation of motor 168 is imparted to shaft 169 through a variable transmission 170, that, in this particular case, consists of two speeds namely a 1—1 and a 1—2 ratio. It will be understood that the ratios of this transmission may be changed to accommodate the apparatus to the use to which it is to be placed and to compensate for transmission ratios throughout the entire apparatus that may vary from those I have used in the construction of the devices described, without departing from the spirit of my invention.

Rotation of shaft 169 is transmitted through gearing 171 to spline shaft 172 upon which is mounted a friction wheel 173 that is adjustable along the radius of a friction disc 174. Friction wheel 173 is adjustable along the radius of friction disc 174 by means of yoke 175 which is mounted upon worm shaft 176 that is rotated by means of knob 177 through miter gearing 178. The rotation of friction disc 174 is transmitted to shaft 51 by means of worm gearing 179. By this description it will be seen that any variation in the speed of rotation of friction disc 47 of Figures 1 and 9 is resolved into a variation in the speed of movement of the stylus 75 of Figures 5 and 17 in the east-west direction.

An identical apparatus is enclosed within the casing 167 for the movement of the stylus 75 in a north-south direction. This movement is induced by variations in the movement of the friction disc 46 of Figures 1, 2, 10, 11 and 12. Shafts 51 and 67 are broken to allow the ready removal of the unit 167 from plotting board 63.

Referring particularly to Figures 20 to 24, 86 represents the arm carrying worm rod 72 which is driven by spline shaft 51 through miter gearing 73 and 74. One end of the tracer arm 86 is carried in straight-edge carriageway 180 in one side of the plotting board 63. The outer end of the tracer arm 86 is carried upon track 181 upon the side of the record board 63 opposite the carriageway 180. Stylus tracer 75 is mounted upon the straight-edge portion 182 of the arm 86. The tracer arm is pivoted at points 183 so that it may be raised away from the surface of the record board to a position similar to that shown in Figure 5. Adjustment of the stylus tracer 75 in an east-west direction may then be made by means of crank element 184 by engaging the same with gear 185 upon the outer end of the worm shaft 72. Worm shaft 72 is broken by a friction clutch, as shown at point 188 in Figure 23, at the point of pivot of the arm 86 with the carriage 185, to allow the arm 86 to be raised.

When it is desired to move the tracer arm and the carriage in a north-south direction, lever 186 (see Figure 22) is raised thus disengaging the worm screw member 187 from the worm shaft 67. Then, by engaging crank element 184 with gear 189 upon the end of a shaft 190, any rotation of the crank element 184 produces a movement of the arm and carriage in a north-south direction by means of pinion gears 191 and 192 engaging respectively racks 181 and 193 upon the record board.

It is to be noted that in Figure 24 there is shown a further means for releasing the stylus carriage 75 to allow it to be moved in a north-south direction. This means consists of an eccentric shaft operated by thumb nut 195, which is held in the in or out position by snap catch 196. In the inward position, member 197 is firmly held in engagement with the worm screw 72 while in the outward position of eccentric shaft 194 member 197 is held free of the worm shaft 72. It is possible to move the stylus carriage freely up and down the carriage arm 86.

Upon the lower side of the stylus member is located a ball bearing 198 firmly held in position by brace 199. The ball 198 carries the weight of the stylus carriage and insures an even pressure of the stylus tracing point upon the surface of the tracing chart.

The scale represented in Figure 25 is produced in the following manner. The curves 1, 1', 2, 2', 3, 3' are produced by plotting the speed of the carrier as the ordinates and as abscissæ the several ratios between the true movement of the carrier over the chart to the actual movement of the speed-log motor or velocity elements for various conditions.

When the pointer 130 is placed at a position corresponding to the speed of the carrier and the speed of the current, a correction is introduced into the track of the carrier upon the chart for the errors introduced therein by these known factors.

The curves shown in Figures 26—28 are produced in the manner described with reference to Figure 25 and are used to correct for errors introduced into the track by the elements described in the legends included in each figure.

Having thus described the elements of my invention and their relation to each other a summary of the effects produced by the operation of the various elements is as follows. The motion of a carrier in a given direction is resolved into two resultant motions corresponding to the cosine of the angular relation of the direction of movement of the carrier to the two cardinal directions. These motions are then combined by means of the mechanism described upon the plotting board and traced upon a chart.

Varying factors were found that introduced errors into the resultant tracing upon the chart. These factors were slippage of the driving mechanism of the carrier at various speeds thereof, motion of the medium through which the carrier was moving and known errors in the directive indicating instruments upon the carrier.

The error introduced by the slippage in the driving mechanism of the carrier is compensated for through the mechanism operated and described with reference to the thumbknob 142 of Figure 15, decreasing or increasing the movement of the motion of the stylus in the two cardinal directions simultaneously thus increasing or decreasing the value dependent upon the cosine of the angle of travel of the carrier relative to the two cardinal directions.

The error introduced into the chart by the motion of the medium through which the carrier was moving is compensated for by the mechanism operated by thumb knob 150 that, through the mechanism described increases or decreases the movement of the stylus tracer in the two cardinal directions.

In this manner the length of tracing is increased to compensate for the additive or subtractive motion of the carrier due to the movement of the medium through which the carrier is travelling.

Those errors introduced into the record upon the chart by the errors in the directive indicating instruments of the carrier are compensated for by increasing the value of the cosine of the angle of the direction of travel of the carrier to one cardinal direction and by decreasing the value of the cosine of the angle of the direction of travel of the carrier to the other cardinal direction so that the resulting chart is a correct record of the true direction of travel of the carrier. These corrections are introduced by means of the mechanism described as operated by knob 164.

The making by power of all of the aforesaid movements simultaneously with the relative motion of the body and a plane surface, and the provision for manual adjustments of the several elements intermediate the power driving means and the resultant record in order to compensate for the variable conditions which human experience can best appreciate and provide, insure accuracy of the resulting record upon whose correctness safety, life and property are dependent.

My method of obtaining such accuracy of record may be achieved by any of many forms of apparatus.

It will be understood that the above description and accompanying drawings comprehend only the general and preferred embodiment of my invention and that minor detail changes in the construction and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

Having thus described my invention, what I claim is as follows:

1. In the operation of recording the course of the relative motion of a body and a plane surface, the method consisting of simultaneously with said motion, making two movements each of whose magnitudes is proportional to said motion; then, simultaneously with said motion, transforming said first movements into two linear right angled movements, the rate of one of which being proportional to the sine, and the other to the cosine, of the angle between the direction of said motion and a reference direction; and simultaneously transforming said two right angled movements into a resultant single movement upon a record.

2. In the operation of recording the course of the relative motion of a body and a plane surface, the method consisting of, simultaneously with said motion, making a movement whose magnitude is proportional to said motion; then, simultaneously with said motion, transforming said first movement into two linear right angled movements, the rate of one of which being proportional to the sine, and the other to the cosine, of the angle between the direction of said motion and a reference direction; then varying the rate of movement to be imparted from said sine movement to compensate for currents and other variable traverse conditions; and simultaneously with said motion transforming said two right angled movements, at said one varied rate, into a resultant single movement upon a record.

3. In the operation of recording the course of the relative motion of a body and a plane surface, the method consisting of, simultaneously with said motion, making a movement whose magnitude is proportional to said motion; then, simultaneously with said motion, transforming said first movement into two linear right angled movements, the rate of one of which being proportional to the sine, and the other to the cosine, of the angle between the direction of said motion and a reference direction; then varying the rate of movement to be imparted from said cosine movement to compensate for drift and other variable directional conditions; and simultaneous with said motion transforming said two linear movements, at said one varied rate, into a resultant single movement upon a record.

4. In the operation of recording the course of the relative motion of a body and a plane surface, the method consisting of, simultaneously with said motion, making a movement whose magnitude is proportional to said motion; then, simultaneously with said motion, transforming said first movement into two linear right angled movements, the rate of one of which being proportional to the sine, and the other to the cosine, of the angle between the direction of said movement and a reference direction; then, varying the rate of movement to be imparted from said sine movement to compensate for currents and other variable traverse conditions, and varying the rate of movement to be imparted from said cosine movement to compensate for drift and other variable directional conditions; and simultaneously with said motion transforming said two right angled movements, at said varied rates, into a resultant single movement upon a record.

5. In the operation of recording the course of the relative motion of a body and a plane surface, the method consisting of, simultaneously with said motion, making two movements each of whose magnitude is proportional to the velocity of said motion; then, simultaneously with said motion, transforming said first movements into two linear right angled movements, the rate of one of which being proportional to the sine, and the other to the cosine, of the angle between the direction of said relative motion and a reference direction; then varying the rate of movement to be imparted from said sine movement to compensate for currents and other variable traverse conditions; and, simultaneously with said motion, transforming said two right angled movements, at said one varied rate, into a resultant single movement upon a record.

6. In the operation of recording the course of the relative motion of a body and a plane surface, the method consisting of, simultaneously with said motion, making two movements each of whose magnitude being proportional to the velocity of said motion; then, simultaneously with said motion, transforming said first movement into two linear right angled movements, the rate of one of which being proportional to the sine, and the other to the cosine, of the angle between the direction of said relative motion and a reference direction; then varying the rate of movement to be imparted from said cosine movement to compensate for drift and other variable directional conditions; and, simultaneously with said motion, transforming said two right angled movements, at said one varied rate, into a resultant single movement upon a record.

7. In the operation of recording the course of the relative motion of a body and a plane surface, the method consisting of, simultaneously with said motion, making two movements each of whose magnitude is proportional to the velocity of said motion; then, simultaneously with said motion, transforming said first movements into two linear right angled movements, the rate of one of which being proportional to the sine, and the other to the cosine, of the angle between the direction of said relative motion and a reference direction; then varying the rate of movement to be imparted from said sine movement to compensate for currents and other variable traverse conditions, and varying the rate of movement to be imparted from said cosine movement to compensate for drift and other variable directional conditions; and, simultaneous with said movement, transforming said two right angled movements, at said varied rates, into a resultant single movement upon a record.

8. In the operation of recording the course of the relative motion of a body and a plane surface, the method consisting of the step of making a plurality of definite movements proportional to the velocity and direction of said motion, the step of resolving said movements into a resultant single movement upon a record and intermediate said steps varying the rate of movement to be transmitted from one of said intermediate movements to compensate for variable traverse conditions.

9. In the operation of recording the course of the relative motion of a body and a plane surface, the method consisting of the step of making a plurality of definite movements proportional to the velocity and direction of said motion, the step of resolving said movements into a resultant single movement upon a record, and intermediate said steps varying the rate of movement to be transmitted from one of said intermediate movements to compensate for variable directional conditions.

10. In the operation of recording the course of the relative motion of a body and a plane surface, the method consisting of the step of making a plurality of definite movements proportional to the velocity and direction of said motion, the step of resolving said movements into a resultant single movement upon a record, and intermediate said steps varying the rate of movement to be transmitted from two of said intermediate movements to compensate respectively for variable traverse and directional conditions.

11. In apparatus for recording the course of the relative motion of a body and a plane surface; means for making, simultaneously with said motion, two movements each of whose magnitude is proportional to the relative velocity of said motion; means for transforming, simultaneously with said motion, said first movements into two linear right angled movements, the rate of one of which being proportional to the sine, and the other to the cosine, of the angle between the direction of said relative motion and a reference direction; and means for simultaneously transforming said two right angled movements into a resultant single movement upon a record.

12. In the apparatus for recording the course of the relative motion of a body and a plane surface; means for making, simultaneously with said motion, a movement whose magnitude is proportional to the relative velocity of said motion; means for transforming, simultaneously with said motion, said first movement into two linear right angled movements, the rate of one of which being proportional to the sine, and the other to the cosine, of the angle between the direction of said relative motion and a reference direction; means for varying the rate of movement to be imparted from said sine movement to compensate for variable traverse conditions; and means for transforming, simultaneously with said motion, said two right angled movements, at said varied rate for one of said last stated movements, into a resultant single movement upon a record.

13. In apparatus for recording the course of the relative motion of a body and a plane surface; means for making, simultaneously with said motion, a movement whose magnitude is proportional to the relative velocity of said motion; means for transforming, simultaneously with said motion, said first movement into two linear right angled movements, the rate of one of which being proportional to the sine, and the other to the cosine, of the angle between the direction of said relative motion and a reference direction; means for varying the rate of movement to be imparted from said cosine movement to compensate for variable directional conditions; and means for transforming said two linear movements, at said one varied rate, into a resultant single movement upon a record.

14. In apparatus for recording the course of the relative motion of a body and a plane surface; means for making, simultaneously with said motion, a movement whose magnitude is proportional to the relative velocity of said motion; means for transforming, simultaneously with said motion, said first movement into two linear right angled movements, the rate of one of which being proportional to the sine, and the other to the cosine, of the angle between the direction of said relative motion and a reference direction; means for varying the rate of movement to be imparted from said sine movement to compensate for variable traverse conditions; means for varying the rate of movement to be imparted from said cosine movement to compensate for variable directional conditions; and means for transforming said two right angled movements, at said varied rates, into a resultant single movement upon a record.

15. In apparatus for recording the course of the relative motion of a body and a plane surface; means for making simultaneously with said motion, two movements each of whose magnitude is proportional to the velocity of said motion; means for transforming, simultaneously with said motion, said first movements into two linear right angled movements, the rate of one of which being proportional to the sine, and the other to the cosine, of the angle between the direction of said relative motion and a reference direction; means for varying the rate of movement to be imparted from said sine movement to compensate for variable traverse conditions; and means for transforming, simultaneously with said motion, said two right angled movements, at said one varied rate, into a resultant single movement upon a record.

16. In apparatus for recording the course of the relative motion of a body and a plane surface; means for making, simultaneously with said motion, two movements each of whose magnitude being proportional to the velocity of said motion; means for transforming, simultaneously with said motion, said first movements into two linear right angled movements, the rate of one of which being proportional to the sine, and the other to the cosine, of the angle between the direction of said relative motion and a reference direction; means for varying the rate of movement to be imparted from said cosine movement to compensate for variable directional conditions; and means for transforming, simultaneously with said motion, said two right angled movements, one at said varied rate, into a resultant single movement upon a record.

17. An apparatus for recording the course of the relative motion of a body and a plane surface; means for making simultaneously with said motion, two movements each of whose magnitude is proportional to the velocity of said motion; means for transforming, simultaneously with said motion, said first movements into two linear right angled movements, the rate of one of which being proportional to the sine, and the other to the cosine, of the angle between the direction of said relative motion and a reference direction; means for varying the rate of movement to be imparted from said sine movement to compensate for variable traverse conditions; means for varying the rate of movement to be imparted from said cosine movement to compensate for variable directional conditions; and means for transforming said two right angled movements, at said varied rates, into a resultant single movement upon a record.

18. In apparatus for recording the course of the relative motion of a body and a plane surface, means for making two definite movements proportional to the velocity and direction of said motion; means for resolving said movements into a resultant single movement upon a record; and means intermediate said first and second named means for varying the rate of movement to be transmitted from said first named means to said second named means to compensate for variable traverse conditions.

19. In apparatus for recording the course of the relative motion of a body and a plane surface, means for making two definite movements proportional to the velocity and direction of said motion; means for resolving said movements into a resultant single movement upon a record; and means intermediate said first and second named means for varying the rate of movement to be imparted from said first named means to said second named means to compensate for variable directional conditions.

20. In apparatus for recording the course of the relative motion of a body and a plane surface, means for making two definite movements proportional to the velocity and direction of said motion; means for resolving said movements into a resultant single movement upon a record; means intermediate said first and second named means for varying the rate of movement to be transmitted from one of the later movements of said first named means to said second named means to compensate for variable traverse conditions; and separate means intermediate said first and second named means for varying the rate of movement to be transmitted from another of the later movements of said first named means to said second named means to compensate for variable directional conditions.

21. In apparatus for recording the course of the relative motion of a body and a plane surface, a log motor, a directional motor, record means, means driven by said two motors for producing on said record means said course of said body; and manually operated means intermediate said log motor and said second named means for adjusting the rate of movement of said second named means to compensate for variable traverse conditions.

22. In apparatus for recording the course of the relative motion of a body and a plane surface, a log motor, a directional motor, record means, means driven by said two motors for producing on said record means said course of said body; and manually operated means intermediate said directional motor and said second named means for adjusting the rate of movement of said second named means to compensate for variable directional conditions.

23. In apparatus for recording the course of the relative motion of a body and a plane surface, a log motor, a directional motor, record means, means driven by said two motors for producing on said record means said course of said body; and a plurality of manually operated means intermediate said motors and record means for adjusting the rates of movement of said second named means to compensate for variable conditions encountered.

FRANK N. SAYRE.